United States Patent
Walter et al.

(10) Patent No.: US 8,077,076 B2
(45) Date of Patent: Dec. 13, 2011

(54) FMCW RADAR SENSOR

(75) Inventors: Thomas Walter, Renningen (DE); Herbert Olbrich, Rutesheim (DE); Dirk Steinbuch, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 392 days.

(21) Appl. No.: 12/227,810

(22) PCT Filed: Jun. 11, 2007

(86) PCT No.: PCT/EP2007/055718
§ 371 (c)(1),
(2), (4) Date: Apr. 21, 2009

(87) PCT Pub. No.: WO2008/006653
PCT Pub. Date: Jan. 17, 2008

(65) Prior Publication Data
US 2009/0315761 A1 Dec. 24, 2009

(30) Foreign Application Priority Data
Jul. 13, 2006 (DE) .......................... 10 2006 032 539

(51) Int. Cl.
*G01S 13/08* (2006.01)
*G01S 13/93* (2006.01)
(52) U.S. Cl. ........................... 342/70; 342/118; 342/128
(58) Field of Classification Search .............. 342/70–72, 342/100–103, 118, 132, 134–135
See application file for complete search history.

(56) References Cited

U.S. PATENT DOCUMENTS

| | | | |
|---|---|---|---|
| 4,825,214 A * | 4/1989 | Dejaegher | 342/128 |
| 4,901,083 A * | 2/1990 | May et al. | 342/128 |
| 5,134,411 A * | 7/1992 | Adler | 342/130 |
| 5,633,642 A * | 5/1997 | Hoss et al. | 342/70 |
| 5,764,187 A | 6/1998 | Rudish | |
| 5,940,029 A * | 8/1999 | Ninomiya et al. | 342/372 |
| 6,031,483 A * | 2/2000 | Urabe et al. | 342/70 |
| 6,097,331 A * | 8/2000 | Matsugatani et al. | 342/70 |
| 6,137,434 A | 10/2000 | Tohya et al. | |
| 6,856,280 B1 | 2/2005 | Eder et al. | |
| 7,379,013 B2 * | 5/2008 | Dean et al. | 342/27 |
| 2002/0175859 A1 | 11/2002 | Newberg et al. | |
| 2003/0095068 A1 | 5/2003 | Purdy et al. | |
| 2007/0247352 A1 * | 10/2007 | Michael et al. | 342/128 |
| 2009/0315761 A1 * | 12/2009 | Walter et al. | 342/200 |

FOREIGN PATENT DOCUMENTS

| | | |
|---|---|---|
| DE | 10355796 | 6/2005 |
| DE | 102006032539 A1 * | 1/2008 |
| EP | 1380854 | 1/2004 |
| WO | WO 2004051305 A2 * | 6/2004 |
| WO | WO 2005/018040 | 2/2005 |
| WO | WO 2006032569 A1 * | 3/2006 |
| WO | WO 2006045649 A1 * | 5/2006 |
| WO | WO 2008006653 A1 * | 1/2008 |

OTHER PUBLICATIONS

International Search Report, PCT International Patent Application No. PCT/EP2007/055718, dated Aug. 22, 2007.

* cited by examiner

*Primary Examiner* — John Sotomayor
(74) *Attorney, Agent, or Firm* — Kenyon & Kenyon LLP

(57) ABSTRACT

An FMCW radar sensor having a plurality of antenna elements and a supply circuit for supplying transmission signals having ramp-shaped modulated frequencies to the antenna elements, including a switchover device for switching over the supply circuit between a near-field mode, in which the transmission signals supplied to the individual antenna elements have a certain frequency offset, and a far-field mode, in which the frequencies of the transmission signals are identical.

10 Claims, 5 Drawing Sheets

FMCW RADAR SENSOR

CROSS-REFERENCE TO RELATED APPLICATION

This application was filed as International Patent Application No. PCT/EP2007/055718 on Jun. 11, 2007 and claims foreign priority benefits of German Patent Application No. 10 2006 032 539.7, filed Jul. 13, 2006.

FIELD OF THE INVENTION

The present invention relates to an FMCW radar sensor having a plurality of antenna elements and a supply circuit for supplying transmission signals having ramp-shaped modulated frequencies into the antenna elements.

BACKGROUND INFORMATION

Antenna elements may be individual antennas or patches, for example, which are offset with respect to the optical axis of a common radar lens. The directional characteristic of each antenna element, specifically the direction in the greatest radiation intensity or the greatest sensitivity, is then given by the offset of the respective element with respect to the optical axis. Alternatively, however, the antenna elements may be so-called phased arrays made up of multiple sub-elements, which are supplied with transmission signals having such a phase relationship that the desired directional characteristic results by interference. The same antenna elements or alternatively separate antenna elements may be used for transmitting and for receiving the radar signals.

Such radar sensors are used, for example, in so-called ACC systems (adaptive cruise control) for motor vehicles and serve the purpose of measuring the distances and relative speeds of preceding vehicles so as to allow for an adaptive distance control and speed control. A certain angular resolution capability of the radar sensor makes possible the determination of the azimuth angle of the located objects, so that, for instance, one may distinguish between preceding vehicles in one's own lane and vehicles in side lanes.

As an example of such a radar sensor, European Patent Application No. EP 1 380 854 A2 describes a static FMCW multibeam radar. In this connection, the term "static" signifies that the directions of the radar beams generated by the individual antenna elements are invariable over time so that the entire locating angle range of the angular resolution radar sensor may be monitored simultaneously by parallel evaluation of the signals supplied by the individual antenna elements.

In an FMCW radar (frequency modulated continuous wave), the frequency of the transmission signals supplied to the individual antenna elements is modulated in ramp-shaped fashion. The signal received from each individual antenna element is mixed with the transmission signal that is supplied to this antenna element. In this manner, an intermediate-frequency signal is obtained, the frequency of which indicates the frequency difference between the transmitted signal and the received signal. This frequency difference is a function of the relative speed of the located object on account of the Doppler effect, but is also a function of the signal propagation time, and thus of the distance of the object, due to the modulation of the transmitted signal.

The intermediate frequency signals are digitized and recorded over a time span approximately corresponding to one individual frequency ramp. The signal pattern thus obtained is then split up into its frequency spectrum by fast Fourier transform. In this spectrum, each located object emerges as one individual peak, the frequency position of which is a function of the distance and the relative speed of the respective object. If the transmitted signals are alternately modulated using frequency ramps having different ramp slopes, for example having a rising ramp and a falling ramp, then it is possible definitely to determine, for an individual object, the distance and the relative speed of the object from the position of the peaks in the spectrums obtained for the two ramps. If multiple objects are located simultaneously, then it is necessary, for a definite allocation of the peaks to the respective objects, to modulate the transmitted signals using at least one additional frequency ramp.

For each channel, i.e., for each antenna element, a spectrum is obtained on each frequency ramp, in which the located objects emerge in the form of a peak. For the peaks pertaining to an individual object, the amplitude and the phase of the intermediate frequency signal, for example at the apex of the peak, differ somewhat from channel to channel. The differences in the amplitude and phase, collectively also known as a complex amplitude, result from the different directional characteristics of the antenna elements and are a function of the azimuth angle of the respective object.

For each individual antenna element, the complex amplitude displays a characteristic dependence on the azimuth angle, which may be represented in an antenna diagram. The distance and the relative speed of the object enter into the complex amplitude only in the form of a factor, which is identical for all channels. By comparing the complex amplitudes in the different channels, it is thus possible to determine the azimuth angle of the respective object. Stated in simplified terms, the azimuth angle is sought at which the complex amplitudes measured respectively at the apex of the peak fit best with the associated antenna diagrams. In the radar sensor described in European Patent Application No. EP 1 380 854 A2, in order to improve the angular resolution, the complex amplitude is evaluated not only at the apex of the respective peak, but at multiple frequencies in proximity to this apex.

In the conventional radar sensor, the same frequency-modulated transmission signal is supplied to all antenna elements. As an example, let it be assumed that the same antenna elements are used for transmission and for reception. Each antenna element then receives a radar echo, not only from the signal that it had sent itself, but also from the signals sent by the other antenna elements. Provided they come from the same object, all these signals have the same frequency and are superposed on each other on the receiving antenna element to form a composite signal. Now, if, for example, two objects which differ in their azimuth angle, but have the same distance and the same relative speed, then their signals can no longer be separated in the spectrum so that the radar sensor is unable to resolve the different azimuth angles of the two objects.

Another effect that impairs the angular resolution capacity of the known radar sensor results from the fact that the individual antenna elements do not generate sharply bundled beams, but rather relatively widely fanned radar lobes, due to diffraction and interference effects. Typically, two or more secondary lobes form in addition to a main lobe. The form and intensity of the main lobes and the secondary lobes are influenced by the coupling with the equal-frequency signals transmitted by other antenna elements.

In the case of advanced ACC systems which are also to be used, for example, in urban traffic or in stop and go operation in a traffic jam, the detailed recording of the traffic environment is required in the near field. The FMCW radar sensor described above is generally not sufficient for this purpose, because in the near field the radar lobes are not yet fanned sufficiently widely, so that objects that are offset laterally are not able to be located. Up to now, it has therefore been necessary to provide additional sensoric components for the near-field, to supplement the FMCW radar sensor, or to switch over between strongly and weakly bundling antennas or activation patterns for the phased arrays, which requires a relative complex design.

SUMMARY

It is an object of the present invention to create an FMCW radar sensor that is able to be used for locating objects in the near-field as well. In this context, additional active elements should be omitted, to the greatest extent possible.

The object may be attained, according to an example embodiment of the present invention, by a switchover device for switching over the supply circuit between a near-field mode, in which the transmission signals supplied to the individual antenna elements have a certain frequency offset, and a far-field mode, in which the frequencies of the transmission signals are identical.

In the far-field mode, as in the usual FMCW radar sensor, the result is a coupling between the signals transmitted by various antenna elements. By a suitable arrangement of the antenna elements this coupling may be influenced in such a way that a relatively sharply bundled main lobe is created that is particularly suitable for locating objects in the far field.

In the near-field mode, on the other hand, the signals transmitted by the various antenna elements are decoupled from one another because of the frequency offset. This enables an additionally fanned out main lobe to be achieved, so that an enlarged location angle area comes about which also makes possible in the near field the location of objects having a greater lateral offset.

The switchover between the two modes may be managed very simply, in the radar sensor according to the present invention, by switching on and off the frequency offset. Thus, the sensor may be adapted in a simple manner to the respective application case, in optimal fashion. For instance, for trips involving greater speeds one may select the far-field mode, while at lower speeds, or in stop and go operation, switching is able to take place automatically to the near-field mode. Switching in rapid sequence between the two operating modes is also possible, so that the near field and the far field may be monitored almost simultaneously.

An additional advantage in the near-field mode is that, on the basis of the frequency offset, it is possible to distinguish, within the signal received from a single antenna element, between the portion of the signal that was transmitted by this antenna element itself and the portions of the signal transmitted by other antenna elements. Thus, for an individual radar object, for example, that is located in the overlapping region of two radar lobes, two peaks are now obtained in the spectrum of each of the two associated channels, one of which represents the direct echo, i.e., the signal that was transmitted by the respective antenna element and was also received by it again, while the other peak represents the so-called cross echo that was transmitted by the other antenna element. The frequency difference between these two peaks corresponds to the frequency offset between the transmitted signals. If, in the radar sensor according to the present invention, one evaluates the complex amplitudes only at the apex of each peak, for example, one consequently obtains altogether four complex amplitudes from the two antenna elements involved, in comparison with only two complex amplitudes in the case of the conventional sensor. A substantially higher number of measured values is thus available for determining the azimuth angle, which markedly improves the angular resolution capacity. In particular, even when evaluating the signals of only two radar lobes, it is now possible to resolve two angularly offset objects that have the same distance and the same relative speed. This measuring principle and evaluation principle as such is the subject matter of a parallel patent application filed by the Applicant and has as its title "Angle-Resolving Radar Sensor".

The fact that the transmitting frequency is increased in at least one antenna element then yields the following additional advantage: As was explained above, the position of the signal generated by a radar object in the frequency spectrum is a function of the relative speed of the object and may thus, at certain relative speeds, also be shifted into the so-called DC range of the spectrum, i.e., into the frequency range surrounding the frequency zero, or even into the range of negative frequencies. It is not possible to detect or evaluate signal portions in the DC range using conventional FMCW radar sensors. In the complex intermediate frequency signal $Z=|A|e^{ift}$, positive and negative frequencies differ by the sign of frequency f. However, since in the conventional FMCW method, in the last analysis, only the absolute value of the real component of the intermediate frequency signal is evaluated, it is not possible to distinguish between positive and negative frequencies, so that the measuring result may be falsified if significant signal portions are in the negative spectral range. In the FMCW radar according to the present invention, at least in the near-field mode, the intermediate frequency signal for each channel is formed by mixing the signal received from the respective antenna element with a base signal, the frequency of which is at most equal to the smallest of the transmitting frequencies supplied to the different antenna elements. At least for one of the channels, the signal in the spectrum is therefore shifted by the frequency offset to positive frequencies so that the entire signal or at least a greater portion of it now lies in the positive frequency range capable of evaluation.

The bundling and forming of the radar lobes may optionally take place using radar lenses or by developing the antenna elements as phased arrays. It is also possible that the antenna elements are not distinguishable from one another in their directional characteristic, and the determination of the azimuth angle takes place solely with the aid of the phase differences between the signals received.

In one advantageous specific embodiment, the supply circuit has a separate oscillator for each antenna element which generates the ramp-shaped modulated transmission signal, and whose frequency band may be switched over with the aid of the switchover device, so that the oscillators operate either in the same frequency band or in offset frequency bands.

In order to minimize the phase jitter of the oscillators, it is expedient to provide a phase regulation for each oscillator, for instance, with the aid of a PLL (phase locked loop). It is also expedient, for the minimization of the phase jitter, if the transmission signals generated by the various oscillators are derived from a common reference signal that is generated by a very low-noise reference oscillator, preferably in a DRO (dielectric resonance oscillator).

In the far-field mode, no evaluation of cross echoes is possible in the simplest specific embodiment. However, in one refinement it is possible to combine the two operating modes in a meaningful way, by adapted algorithms in the signal processing, so that the angular resolution capacity is improved even in the far-field mode. One may, for instance, think of combining the antenna elements to form groups, and to supply the elements of each group with phase-offset transmission signals, even in the far-field mode. The switchover device then has the effect that the antenna elements from different groups corresponding to one another are supplied in the far-field mode with identical frequencies, and by contrast, in the near-field mode, also with frequencies that are offset to one another.

BRIEF DESCRIPTION OF THE DRAWINGS

Exemplary embodiments of the present invention are depicted in the figures and described in greater detail below.

DETAILED DESCRIPTION OF EXAMPLE EMBODIMENTS

Figure 1:
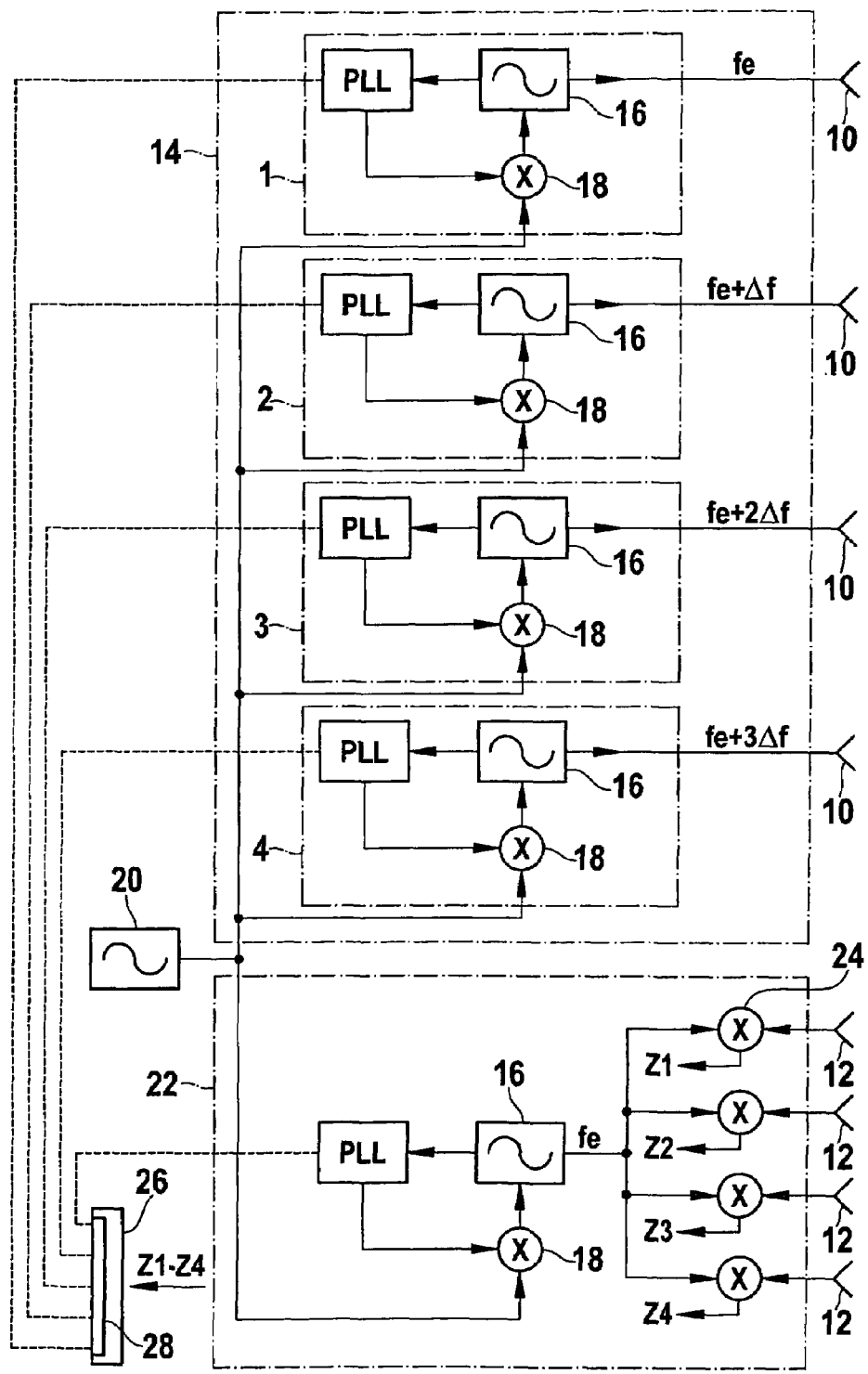
FIG. 1 shows a block diagram of an FMCW radar sensor according to an example embodiment of the present invention.

The FMCW radar sensor shown in FIG. 1 has four antenna elements 10 for transmitting the radar signals and four separate antenna elements 12 for receiving the signal reflected at the objects.

A supply circuit 14 is subdivided into four channels 1, 2, 3, 4, which are each assigned to one of antenna elements 10. Each channel includes a local oscillator 16 (VCO; voltage controlled oscillator) and a phase-coupling loop PLL (phase locked loop) for the phase regulation and phase stabilization of oscillator 16 via a mixer 18.

Mixers 18 of all four channels 1, 2, 3 and 4 receive a reference signal from a common reference oscillator 20, for instance, a DRO (dielectric resonance oscillator), which is distinguished by a very low phase jitter. The frequency of oscillators 16 is of the order of magnitude of 76 GHz, for example, while the frequency of reference oscillator 20 amounts to about a quarter of this. An intermediate frequency signal is supplied to each of mixers 18 by the associated PLL, for the purpose of raising the frequency of reference oscillator 20 to the transmission frequency of oscillator 16, which is then regulated by the PLL in a manner free from phase shift. The PLL's make it possible, in this context, to regulate the frequency of each oscillator 16 individually, and additionally give rise to modulation of the transmission frequency that is required for an FMCW radar.

A four-channel receiving circuit arrangement 22 is assigned to antenna elements 12, which has a mixer 24 for each antenna elements. A common phase-regulated oscillator 16, having an associated PLL and an associated mixer 18 is provided here for all four channels. The high frequency signal of this oscillator 16 is mixed by mixer 24 with the signals received by the respective antenna elements 12, so that intermediate frequency signals Z1, Z2, Z3 and Z4 are generated as output signals. Even mixer 18 of receiving circuit arrangement 22 receives the reference signal generated by reference oscillator 20.

Intermediate frequency signals Z1-Z4 that are generated in receiving circuit arrangement 22 are processed further in an evaluation unit 26, that is shown in FIG. 1 only as a block. This evaluation unit includes a switchover device 28 that acts upon the PLL's, so as to reprogram them, if necessary, in such a way that the frequency relationship between the transmission signals is altered.

Figure 2:
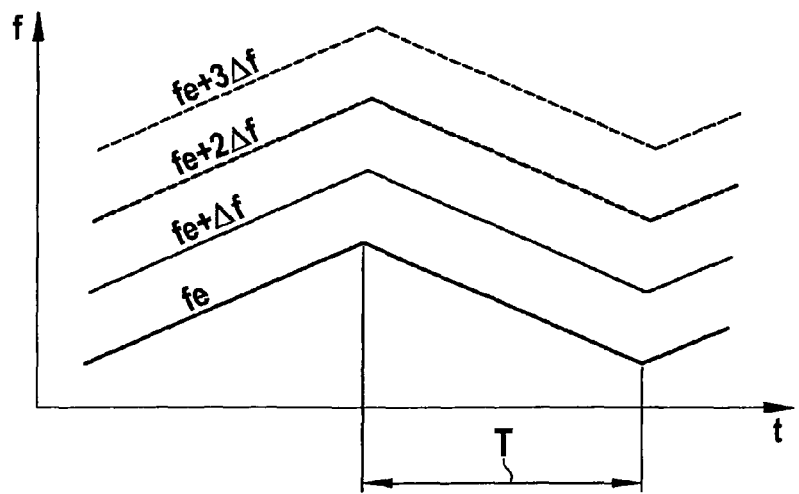
FIG. 2 shows a frequency/time diagram for transmission signals for different antenna elements.

In the example shown, antenna element 10 associated with channel 1 receives a transmission signal having a base frequency fe, which is modulated in a ramp-shaped fashion, which is shown in a simplified manner in FIG. 2. The transmission signals supplied to the remaining antenna elements 10 are modulated in a ramp-shaped fashion with the aid of the respectively associated PLL, namely, constantly having the same ramp duration T and the same (positive or negative) ramp slope. In a near-field mode that is able to be activated with the aid of switchover device 28, the transmission frequencies are, however, shifted with respect to one another in the four channels, in each case by a frequency offset Δf, as is also shown in FIG. 2.

On the other hand, switchover device 28 is able to bring about a switching over to a far-field mode, in which the modulated transmission signals for all antenna elements 10 have identical frequencies, namely the base frequency fe, and also have the same phase.

The signal generated by oscillator 16 in receiving circuit arrangement 22 and supplied to all four mixers 24 constantly has the base frequency fe, in the example shown, and is phase-synchronized with the transmission signals for all antenna elements 10 in the far-field mode.

Figure 3:
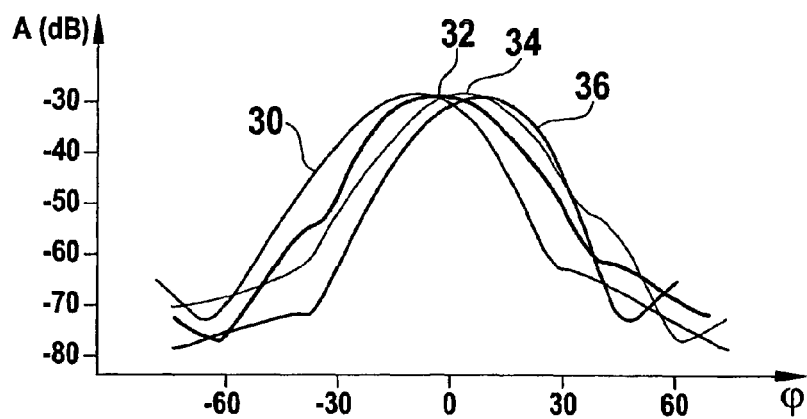
FIG. 3 shows an antenna diagram for a near-field mode.

FIG. 3 shows four curves 30, 32, 34 and 36, which indicate the antenna characteristics of the four antenna elements 10 in the near-field mode, that is, in the mode in which the transmission frequencies are offset from one another in the manner shown in FIG. 2. Based on the different transmission frequencies, since no coupling takes place between adjacent antenna elements, the antenna elements have a relatively small aperture in this mode and correspondingly broad main lobes, so that the radar radiation is in each case radiated in a relatively large region of azimuth angles φ. The apices of the curves in FIG. 3, which indicate the direction in which amplitude A of the emitted radiation is a maximum, have some angular offset with respect to one another.

Figure 4:
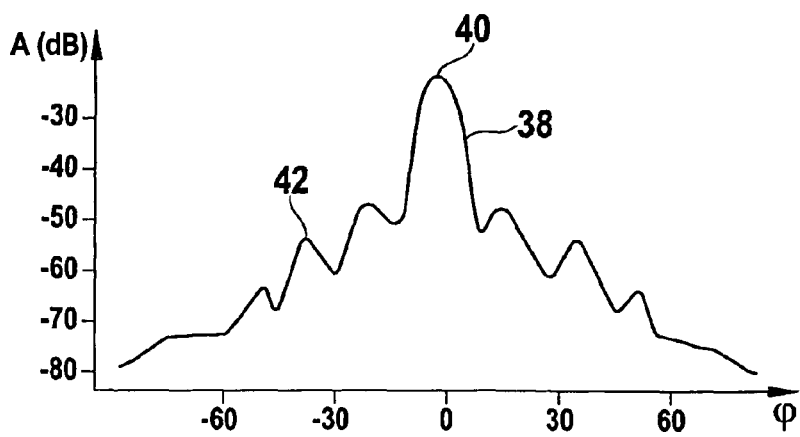
FIG. 4 shows an antenna diagram for a far-field mode.

In the far-field mode, when all antenna elements 10 are supplied with phase-synchronous signals of the same frequency, the four antenna elements, by contrast, behave like a single, extended antenna array, whose characteristic is given in FIG. 4 by a single curve 38. Because of coupling and interference, there now comes about the development of a relatively narrow, meaning well bundled, main lobe 40 and a few clearly weaker side lobes 42. As a result, a high directional effect is achieved in this mode, as is desired for the far field.

Figure 5:
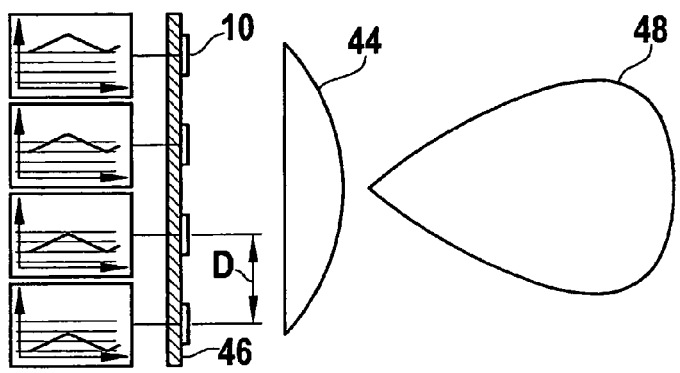
FIG. 5 shows a sketch for explaining the functioning of the radar sensor in the near-field mode.

FIG. 5 shows a schematic representation of the arrangement of antenna elements 10. The four antenna elements 10 are positioned in the focal plane of a lens 44 at uniform distances D on a board 46. If λ is the wavelength of the 76 GHz radar radiation, the distance D amounts to approximately between 0.5 and 0.8 λ. Since antenna elements 10 are in each case offset more or less far with respect to the optical axis of lens 44, angular deviations in the main radiation directions of these antenna elements come about that are shown in FIG. 3.

The transmission signals supplied to the individual antenna elements 10 are shown in FIG. 5 for the near-field mode. The frequency-modulated signals are each offset by Δf in frequency, so that antenna elements 10 are decoupled and each form a relatively broad radar lobe 48, which is shown symbolically in FIG. 5. It is expedient, though not essential, for all the antenna elements to have the same distance from their neighbors.

Figure 6:
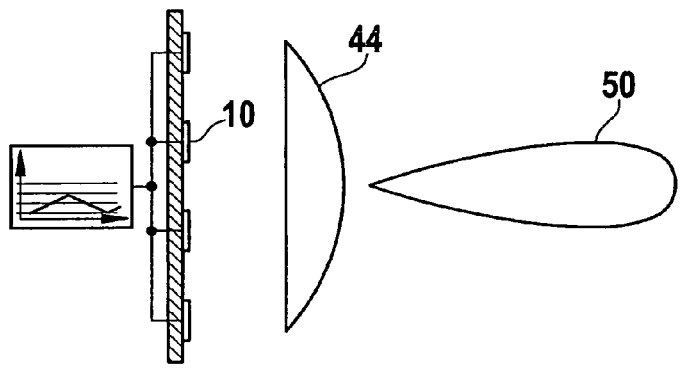
FIG. 6 shows a sketch for explaining the functioning in the far-field mode.

FIG. 6 shows a corresponding diagram for the far-field mode. In this case, the transmission signals have the same frequency for all antenna elements 10, so that coupling brings about the development of a clearly more narrow radar lobe 50, whose width is, for example, only ¼ of the width of radar lobe 48 in FIG. 5. For this, distance D between the antenna elements should be in the range mentioned above.

Figure 7:
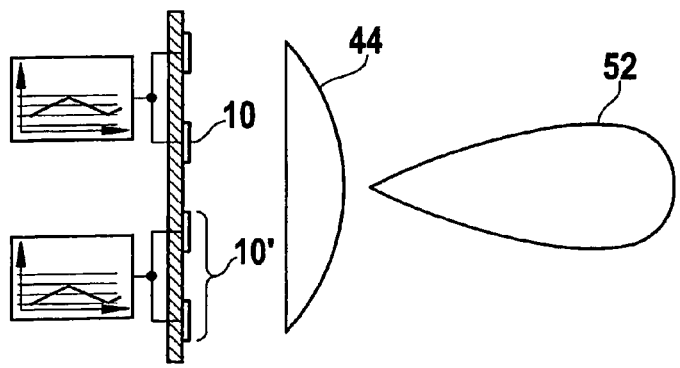
FIG. 7 shows a sketch for explaining the functioning in a mixed mode.

Finally, FIG. 7 shows a mixed mode which, because of the flexibility in frequency modulation attained by the PLL's, may be programmed without a problem, and then selected with the aid of switchover device 28. In this mode, two at a time of adjacent antenna elements 10 having the same frequency are activated, for instance, one pair having base frequency fe and the other pair having the frequency fe+Δf. Consequently, in this instance, coupling takes place only between the two antenna elements of the same pair, and resulting radar lobe 52 is wider than radar lobe 50, but narrower than radar lobe 48. The mixed mode according to FIG. 7 may be regarded as a modified form of the far-field mode, if one views the two antenna elements belonging to a pair as being a single antenna element.

Figure 8:
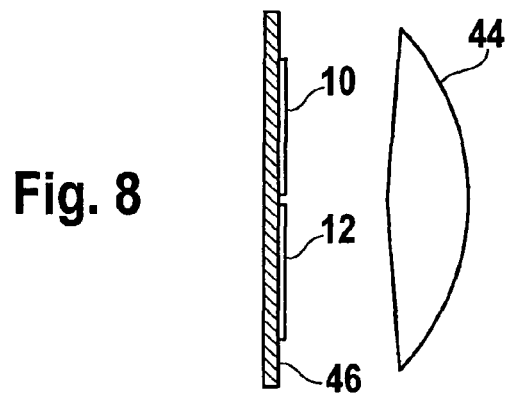
FIG. 8 shows a schematic side view of the radar sensor.

FIG. 8 shows the arrangement of antenna elements 10 and 12 used for transmitting and receiving on board 46. Antenna elements 10 and 12 are arranged vertically offset, and aligned with each other pair-wise. Lens 44 has a prism-like configuration in the vertical direction, by which the vertical offset of the antenna elements is compensated for.

Figure 9:
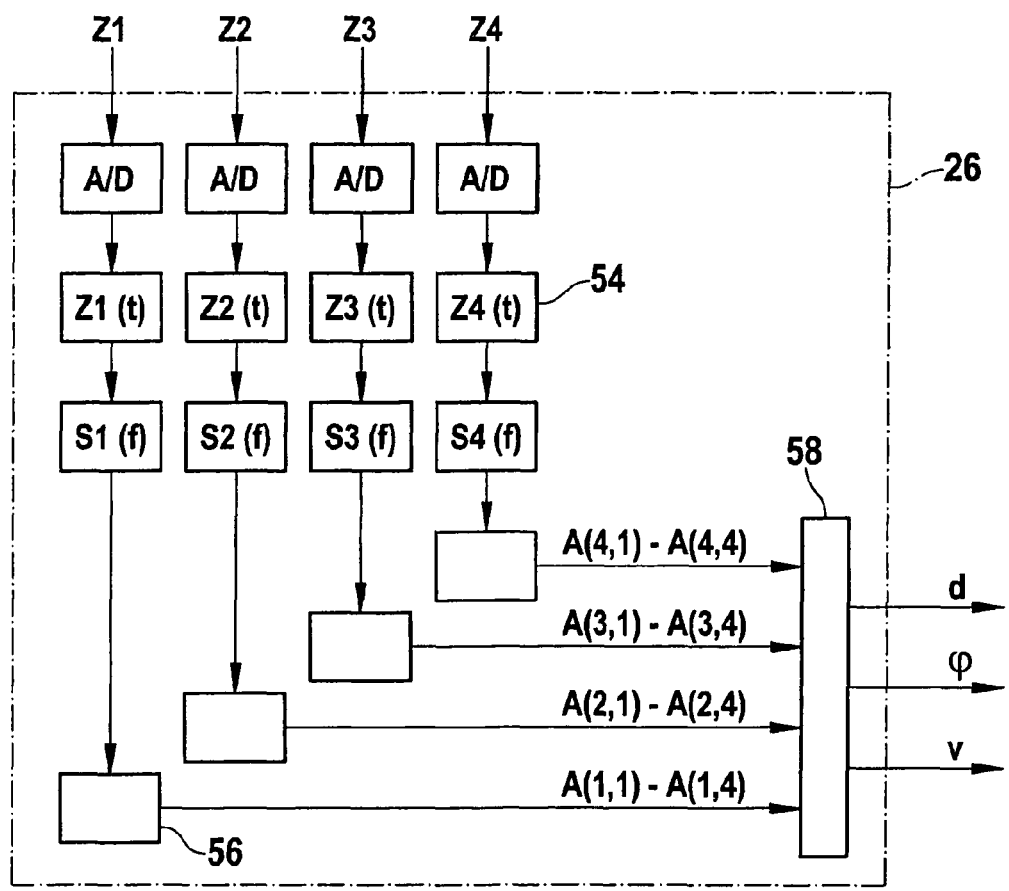
FIG. 9 shows a block diagram of an evaluation device of the radar sensor.

In FIG. 9 a part of evaluation unit 26 is shown as a block diagram. Intermediate frequency signals Z1, Z2, Z3 and Z4 supplied by receiving circuit arrangement 22 are A/D-digitized in analog/digital converters, and then recorded as a function of time in memory devices 54, in each case over a time span which lies within a ramp duration T. These functions are then split by fast Fourier transform into their spectra S1(f), S2(f), S3(f) and S1(f).

In the near-field mode, if a single object is met by the radar lobes of all four antenna elements 10 and all four antenna elements 12 receive the reflected radar radiation, each spectrum includes four peaks separated by Δf, since the frequencies of the intermediate frequency signals in each case correspond to the frequency difference between the received signal and the base signal that is supplied to mixers 24 by oscillator 16 of receiving circuit arrangement 22. For channel 1, this frequency difference is a function only of the distance d and relative speed v of the object. For the remaining channels, the frequency difference includes, in addition, frequency offset Δf, 2Δf or 3Δf, depending on from which antenna elements 10 the radiation was radiated. As a result, the peaks in the near-field mode are each offset by Δf from one another, and are thus clearly distinguishable from one another.

One analysis block 56 is allocated to each channel, which looks up the apices of the four peaks in the spectrum and determines their complex amplitudes. Thus, in channel 1 an amplitude A(1,1) is obtained for the direct echo, that is, for the signal that was transmitted in channel 1 and also received again in channel 1. Correspondingly, amplitudes A(1,2), A(1,3) and A(1,4) are obtained for the other peaks in this spectrum for the cross echoes, that is, for the signals that were transmitted in channels 2, 3 and 4 and were then received in channel 1. In an analogous manner, analysis blocks 56 supply amplitudes A(2,1)-A(2,4), A(3,1)-A(3,4) or A(4,1)-A(4,4) for the remaining channels. All in all, one thus obtains complex amplitude values, for a single object 16, from which one is able to determine phase angle φ of the object with high precision, by comparison with the corresponding antenna diagrams. This determination is made in a computer 58, for instance, by adjustment of the 16 amplitudes to the antenna diagrams, according to the method of least squares or the maximum likelihood method. Computer 59 also calculates distance d and relative speed v of the object, just as in a customary FMCW radar.

Variables φ, d and v thus obtained are passed on to another part of evaluation unit 26, that is not shown. This part of the evaluation unit may be, for example, a conventional ACC regulator, which automatically regulates the distance of a vehicle equipped with a radar sensor from a preceding vehicle. In this context, the ACC regulator is in a position of recording the traffic situation, with the aid of measured data as well as with the aid of additional data concerning the characteristic motion of the vehicle, and is therefore also able automatically to induce switchover device 28 to make the switchover between the near-field mode and the far-field mode, when the traffic situation requires it.

In the far-field mode (FIG. 6) only one single peak is obtained for a single object in each spectrum, since the direct echo and the cross echo are then at the same frequency and are superposed on each other, so that they cannot be evaluated separately. In that case, the operating method of evaluation unit 26 is the same as with a customary multi-beam FMCW radar.

Figure 10:
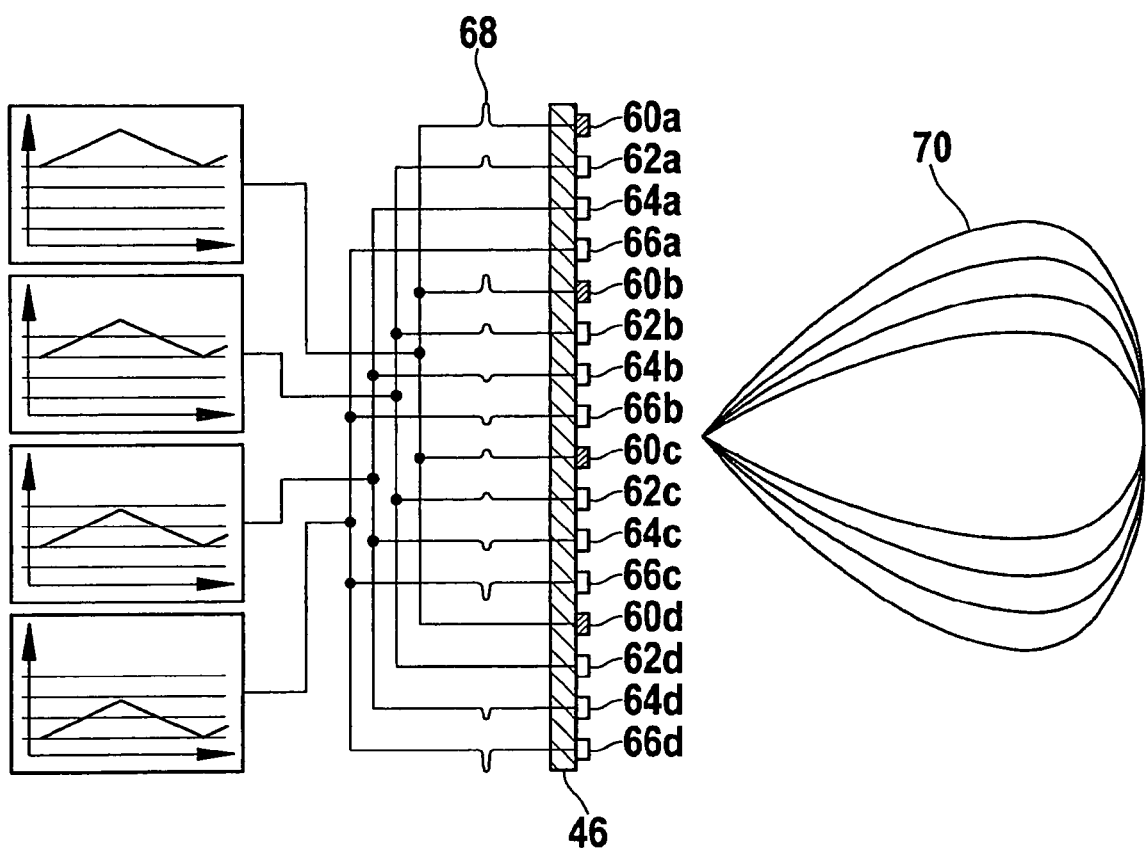
FIG. 10 shows a sketch for explaining the construction and the functioning of a radar sensor according to a modified example embodiment.

FIG. 10 is a diagram analogous to FIG. 5 for the near-field mode, and it illustrates a modified example embodiment of the radar sensor according to the present invention. In this case, the radar sensor does not have a lens, and the bundling of the radar beams as well as the setting of the main radiation direction is achieved using planar phased-ray antennas. Four antenna elements are again shown, which are formed respectively by an array made up of a plurality of subelements, such as the four subelements 60a, 60b, 60c and 60d. The three remaining antenna elements have the subelements 62a-62d, 64a-64d and 66a-66d. The subelements, whose number may in each case also be greater than four, are arranged interspersed on board 46 to have the same distance D to one another as the antenna elements 10 in FIG. 5.

The transmission signals are supplied to the individual subelements via microwave lines, which include more or less long delay lines 68. These delay lines are shown in FIG. 10 only schematically and are found on board 46, in practice. The same transmission signal is supplied to the subelements of each antenna element. However, based on the different lengths of delay lines 68, this transmission signal reaches the individual subelements while having a certain phase shift, which takes care of a deflection of direction and possibly bundling of the radar beam generated by this antenna element. In this way, four radar lobes 70, that are angularly offset with respect to one another, are generated by the four antenna elements.

In the example shown, in the near-field mode, the transmission signal having base frequency fe is supplied to the antenna element having subelements 661-66d, and the remaining antenna elements receive transmission signals having the frequencies fe+Δf, fe+2Δf and fe+3Δf, as is again symbolized by corresponding diagrams. The individual antenna elements are consequently decoupled, so that radar lobes 70 are fanned out appropriately far. In the far-field mode, a transmission signal of the same frequency, such as base frequency fe, is supplied to all the antenna elements, and therewith also to all subelements, so that a sharply bundled radar lobe comes about by coupling.

The antenna elements used for receiving may be arranged analogously to the antenna elements shown in FIG. 10. However, alternatively it is also possible to use the same antenna elements for transmitting and for receiving. For this, the received signal may, for example, be separated from the transmission signal fed in with the aid of a circulator. The corresponding applies also to the exemplary embodiment according to FIGS. 1 through 9.

A further possible modification of the example embodiment shown is that all transmission signals in the near-field mode and possibly also in the far-field mode have a certain frequency offset from the base frequency which is supplied to mixers 24 of receiving circuit arrangement 22. It is achieved thereby that the peaks are shifted to higher frequencies in all spectra, and consequently lie completely in a positive range of the spectrum that is able to be evaluated, even at high relative speed. If necessary, the frequency offset in this context may also be varied as a function of the situation, with the aid of the PLL's.

What is claimed is:

1. An FMCW radar sensor, comprising:
    a plurality of transmitter antenna elements;
    a supply circuit adapted to supply transmission signals having ramp-shaped modulated frequencies to the transmitter antenna elements; and
    a switchover device adapted to switch over the supply circuit between a near-field mode, in which the transmission signals supplied to the individual transmitter antenna elements have a certain frequency offset, and a far-field mode, in which the frequencies of the transmission signals are identical.

2. The radar sensor as recited in claim 1, wherein the supply circuit includes a channel having its own oscillator for each of the transmitter antenna elements to which the transmission signals are supplied, for generating the transmission signals.

3. The radar sensor as recited in claim 2, further comprising:
    receiver antenna elements adapted to receive radar signals, the receiver antenna elements having assigned to them at least one additional oscillator to transform the received radar signals into intermediate frequency signals.

4. The radar sensor as recited in claim 2, wherein the oscillators are phase-regulated.

5. The radar sensor as recited in claim 2, wherein the oscillators are synchronized by a common reference oscillator.

6. The radar sensor as recited in claim 2, wherein the transmitter antenna elements are arranged at distances, which amount to 0.5 to 0.8-fold a wavelength of emitted radar radiation.

7. The radar sensor as recited in claim 2, wherein the transmitter antenna elements are arranged offset to an optical axis of a lens.

8. The radar sensor as recited in claim 2, wherein each of the transmitter antenna elements is formed by an array having a plurality of subelements.

9. The radar sensor as recited in claim 8, wherein the subelements of the transmitter antenna elements are arranged in an interspersed manner.

10. The radar sensor as recited in claim 8, wherein the subelements are arranged at distances apart which amount to 0.5 to 0.8-fold a wavelength of emitted radar radiation.

* * * * *